US008955587B2

(12) United States Patent  
Sherman et al.

(10) Patent No.: US 8,955,587 B2
(45) Date of Patent: Feb. 17, 2015

(54) WELL COMPLETION METHODS USING GELLABLE TREATMENT FLUIDS HAVING LONG TERM THERMAL STABILITY OF THE GELLED STATE

(75) Inventors: John Walter Sherman, Houston, TX (US); Gary P. Funkhouser, Duncan, OK (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 371 days.

(21) Appl. No.: 13/297,663

(22) Filed: Nov. 16, 2011

(65) Prior Publication Data

US 2013/0118740 A1 May 16, 2013

(51) Int. Cl.
| | | |
|---|---|---|
| *E21B 43/26* | (2006.01) |
| *E21B 43/16* | (2006.01) |
| *E21B 33/13* | (2006.01) |
| *C09K 8/508* | (2006.01) |
| *C09K 8/512* | (2006.01) |
| *C09K 8/68* | (2006.01) |
| *C09K 8/88* | (2006.01) |

(52) U.S. Cl.
CPC ............... *C09K 8/5083* (2013.01); *C09K 8/512* (2013.01); *C09K 8/685* (2013.01); *C09K 8/887* (2013.01)
USPC ...................... 166/279; 166/308.1; 166/308.6

(58) Field of Classification Search
CPC ......... E21B 43/13; E21B 33/13; E21B 43/26; C09K 8/00; C09K 8/5083; C09K 8/512; C09K 8/685
USPC .......................... 166/279, 308.1, 308.2, 308.6
See application file for complete search history.

(56) References Cited

U.S. PATENT DOCUMENTS

| | | |
|---|---|---|
| 4,609,476 A | 9/1986 | Heilweil |
| 5,202,441 A | 4/1993 | Suhadolnik et al. |

(Continued)

FOREIGN PATENT DOCUMENTS

WO    2013074217 A1    5/2013

OTHER PUBLICATIONS

Holtsclaw et al., "A Crosslinkable Synthetic Polymer System for High-Temperature Hydraulic Fracturing Applications," 2009 SPE Tight Gas Completions Conference held in San Antonio, TX, 2009, SPE 125250.

(Continued)

*Primary Examiner* — Zakiya W Bates
*Assistant Examiner* — Silvana Runyan
(74) *Attorney, Agent, or Firm* — McDermott Will & Emery LLP; Holly Soehnge

(57) ABSTRACT

Gellable treatment fluids containing a terpolymer that comprises 2-acrylamido-2-methylpropanesulfonic acid, acrylamide, acrylic acid monomer units can be used in various subterranean operations where it is necessary for the treatment fluid to remain in a gelled state for extended periods of time at high formation temperatures. Methods for treating a subterranean formation can comprise providing a treatment fluid comprising an aqueous carrier fluid, a crosslinking agent, a gel stabilizer, and a terpolymer that comprises 2-acrylamido-2-methylpropanesulfonic acid, acrylamide, and acrylic acid monomer units, or any salt thereof; introducing the treatment fluid into a subterranean formation; allowing the treatment fluid to form a gel in the subterranean formation; and breaking the gel after it has been in the subterranean formation for at least about one day.

18 Claims, 16 Drawing Sheets

(56) References Cited

U.S. PATENT DOCUMENTS

| | | | |
|---|---|---|---|
| 5,620,947 | A | 4/1997 | Elward-Berry |
| 6,176,315 | B1 | 1/2001 | Reddy et al. |
| 6,986,391 | B2 | 1/2006 | Funkhouser et al. |
| 7,306,039 | B2 | 12/2007 | Wang et al. |
| 7,314,850 | B2 * | 1/2008 | Taylor et al. .................. 507/238 |
| 8,048,828 | B2 | 11/2011 | Deville |
| 8,048,829 | B2 | 11/2011 | Deville |
| 8,062,997 | B2 | 11/2011 | Deville |
| 2004/0211568 | A1 | 10/2004 | Funkhouser et al. |
| 2005/0230113 | A1 | 10/2005 | Eoff et al. |
| 2006/0037754 | A1 * | 2/2006 | Funkhouser ............... 166/308.1 |
| 2006/0096756 | A1 * | 5/2006 | Weiss et al. .................. 166/279 |
| 2007/0062697 | A1 | 3/2007 | Barbosa et al. |
| 2009/0082228 | A1 * | 3/2009 | Parris et al. .................. 507/211 |
| 2010/0004145 | A1 | 1/2010 | Horton et al. |
| 2010/0048430 | A1 | 2/2010 | Funkhouser et al. |
| 2011/0062085 | A1 | 3/2011 | Deville et al. |
| 2012/0118569 | A1 | 5/2012 | Deville |
| 2012/0258893 | A1 | 10/2012 | Deville |

OTHER PUBLICATIONS

Funkhouser, et al., "Hydraulic Fracturing Under Extreme HPHT Conditions: Successful Application of a New Synthetic Fluid in South Texas Gas Wells," SPE Deep Gas Conference and Exhibition held in Manama, Bahrain, 2010, SPE 132173.

Funkhouser et al., "Synthetic Polymer Fracturing Fluid for High-Temperature Applications"; Society of Petroleum Engineers, Houston, TX, Feb. 5-7, 2003, SPE 80236.

Prada et al., "Evaluation of Gelation Systems for Conformance Control"; Society of Petroleum Engineers, Tulsa, OK, Apr. 3-5, 2000, SPE 59322.

Vollmer, et al., "HEC No Longer the Preferred Polymer"; Society of Petroleum Engineers, Houston, TX Feb. 13-16, 2001, SPE 65398.

International Search Report and Written Opinion for PCT/US2012/059272 dated Jan. 2, 2013.

Official Action for Australian Patent Application No. 2012337285 dated Oct. 9, 2014.

* cited by examiner

Treatment Fluid 1

Treatment Fluid 2

Treatment Fluid 3

Treatment Fluid 5

Treatment Fluid 6

Treatment Fluid 8

Treatment Fluid 9

Treatment Fluid 10

Treatment Fluid 12

Treatment Fluid 13

Treatment Fluid 19

Treatment Fluid 21

Treatment Fluid 28

Treatment Fluid 29

Treatment Fluid 30

Treatment Fluid 31

Treatment Fluid 32

Treatment Fluid 33

Treatment Fluid 36

Treatment Fluid 37

Treatment Fluid 38

Treatment Fluid 39

Treatment Fluid 40

Treatment Fluid 41

Treatment Fluid 42

Treatment Fluid 43

Treatment Fluid 44

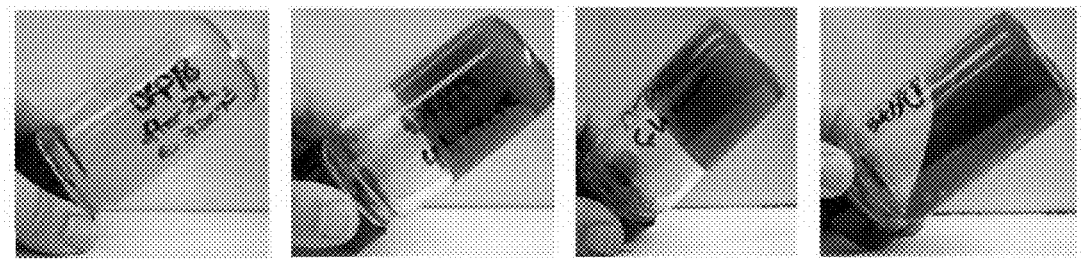
| 2 hours | 4 hours | 6 hours | 16 hours |
| --- | --- | --- | --- |
| FIGURE 2A | FIGURE 2B | FIGURE 2C | FIGURE 2D |
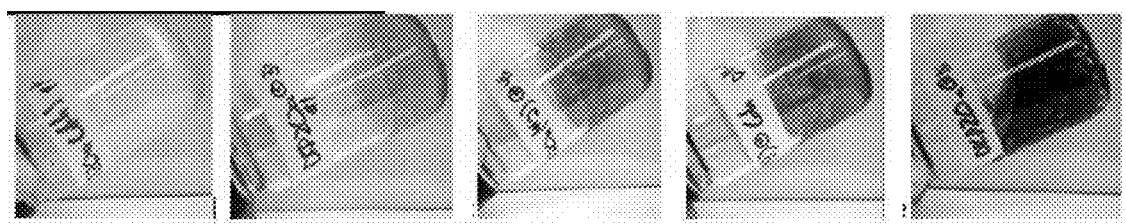
| 2 hours | 3 hours | 4 hours | 6 hours | 16 hours |
| --- | --- | --- | --- | --- |
| FIGURE 3A | FIGURE 3B | FIGURE 3C | FIGURE 3D | FIGURE 3E |

Treatment Fluid 14　　Treatment Fluid 15　　Treatment Fluid 16

Treatment Fluid 14　　Treatment Fluid 15　　Treatment Fluid 16

Treatment Fluid 17    Treatment Fluid 18

Treatment Fluid 48
(w/o carbon steel coupon)

Treatment Fluid 49
(w/ carbon steel coupon)

Treatment Fluid 47
(w/o carbon steel coupon)

Treatment Fluid 46
(w/ carbon steel coupon)

WELL COMPLETION METHODS USING GELLABLE TREATMENT FLUIDS HAVING LONG TERM THERMAL STABILITY OF THE GELLED STATE

BACKGROUND

The present invention generally relates to the use of gellable treatment fluids in subterranean operations, and, more specifically, to the use of gellable treatment fluids that can remain in a gelled state for an extended period of time at high formation temperatures.

Treatment fluids can be employed in a variety of subterranean operations. As used herein the terms "treatment," "treating," other grammatical equivalents thereof refer to any subterranean operation that uses a fluid in conjunction with performing a desired function and/or for achieving a desired purpose. The terms "treatment," "treating," and other grammatical equivalents thereof do not imply any particular action by the fluid or any component thereof. Illustrative subterranean operations that can be performed using treatment fluids can include, for example, drilling operations, fracturing operations, sand control operations, gravel packing operations, acidizing operations, conformance control operations, fluid diversion operations, fluid blocking operations, and the like.

In many cases, treatment fluids can be utilized in a gelled state when performing a treatment operation. For example, in a fracturing operation, a treatment fluid can be gelled to increase its viscosity and improve its ability to carry a proppant or other particulate material. In other cases, a gelled treatment fluid can be used to temporarily divert or block the flow of fluids within at least a portion of a subterranean formation. In the case of fracturing operations, the gelled treatment fluid typically spends only a very short amount of time downhole before the gel is broken and the treatment fluid is produced from the wellbore. In fluid diversion or blocking operations, the gel typically needs to remain in place only for a short amount of time while another treatment fluid is flowed elsewhere in the subterranean formation.

When conducting subterranean operations, it can sometimes become necessary to block the flow of fluids in the subterranean formation for a prolonged period of time, typically for at least about one day or more. In some cases, the period of time can be much longer, days or weeks. For example, it can sometimes be desirable to impede the flow of formation fluids for extended periods of time by introducing a kill pill or perforation pill into the subterranean formation to at least temporarily cease production. As used herein, the terms "kill pill" and "perforation pill" refer to a small amount of a treatment fluid introduced into a wellbore that blocks the ability of formation fluids to flow into the wellbore. In kill pill and perforation pill applications, high density brines can be particularly effective as a carrier fluid, since they can form a highly viscous gel that blocks the flow of fluids within the wellbore by exerting hydrostatic pressure therein. Likewise, in fluid loss applications, it can sometimes be desirable to form a barrier within the wellbore that persists for an extended period of time.

Gelled treatment fluids typically remain in a stable gelled state only for a finite period of time before they break into lower viscosity fluids. In many cases, the decomposition of a gel can be accelerated by using a breaker, if a faster break is desired. For subterranean operations requiring extended downhole residence times, many gelled treatment fluids can prove unsuitable, since they can break before their intended downhole function is completed. The premature break of gelled treatment fluids can be particularly problematic in high temperature subterranean formations (e.g., formations having a temperature of about 275° F. or above), where the elevated formation temperature decreases the gel stability and speeds gel decomposition. As subterranean operations are being conducted in deeper wellbores having ever higher formation temperatures, the issues with long-term gel stability are becoming an increasingly encountered issue as existing gels are being pushed to their chemical and thermal stability limits. Premature breaking can be particularly problematic in high temperature applications of biopolymer-based gellable treatment fluids (e.g., guar- and cellulose-based treatment fluids and the like), where thermally induced chain scission and molecular weight loss can accelerate gel breaking.

Synthetic gellable polymers having increased thermal stability have sometimes been used in place of biopolymers to extend the working temperature range of gellable treatment fluids. One issue with synthetic gellable polymers is that they can sometimes become crosslinked too rapidly or become overly crosslinked during gelling. If crosslinking occurs too rapidly, downhole introduction of the gellable treatment fluids can be complicated due to high friction pressures as the gel becomes too thick to effectively pump before reaching its intended location. If the gel becomes overly crosslinked, the gel can be too viscous, difficult to break and sometimes exhibit excessive syneresis whereby carrier fluid is exuded from the gel.

SUMMARY OF THE INVENTION

The present invention generally relates to the use of gellable treatment fluids in subterranean operations, and, more specifically, to the use of gellable treatment fluids that can remain in a gelled state for an extended period of time at high formation temperatures.

In some embodiments, the present invention provides a method comprising: providing a treatment fluid comprising an aqueous carrier fluid, a crosslinking agent, a gel stabilizer, and a terpolymer that comprises 2-acrylamido-2-methylpropanesulfonic acid, acrylamide, and acrylic acid monomer units, or any salt thereof; introducing the treatment fluid into a subterranean formation; allowing the treatment fluid to form a gel in the subterranean formation; and breaking the gel after it has been in the subterranean formation for at least about one day.

In some embodiments, the present invention provides a method comprising: providing a treatment fluid comprising an aqueous carrier fluid, a crosslinking agent, and a terpolymer that comprises 2-acrylamido-2-methylpropanesulfonic acid, acrylamide, and acrylic acid monomer units, or any salt thereof; introducing the treatment fluid into a subterranean formation; and allowing the treatment fluid to form a crosslinked gel in the subterranean formation that, after formation, does not flow under in situ stress within the subterranean formation.

In some embodiments, the present invention provides a method comprising: providing a treatment fluid comprising an aqueous carrier fluid, a crosslinking agent, a gel stabilizer, and a terpolymer that comprises 2-acrylamido-2-methylpropanesulfonic acid, acrylamide, and acrylic acid monomer units, or any salt thereof; introducing the treatment fluid into a subterranean formation; allowing the treatment fluid to form a gel in the subterranean formation that at least partially blocks the flow of formation fluids in at least a portion of the subterranean formation; and breaking the gel after it has been in the subterranean formation for at least about one day.

The features and advantages of the present invention will be readily apparent to one having ordinary skill in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

FIGS. 2A-2D show a series of photographs illustrating the gellation of treatment fluid 12 at various aging times at 320° F.

FIGS. 3A-3E show a series of photographs illustrating the gellation of treatment fluid 20 at various aging times at 320° F.

DETAILED DESCRIPTION

Figure 1A:
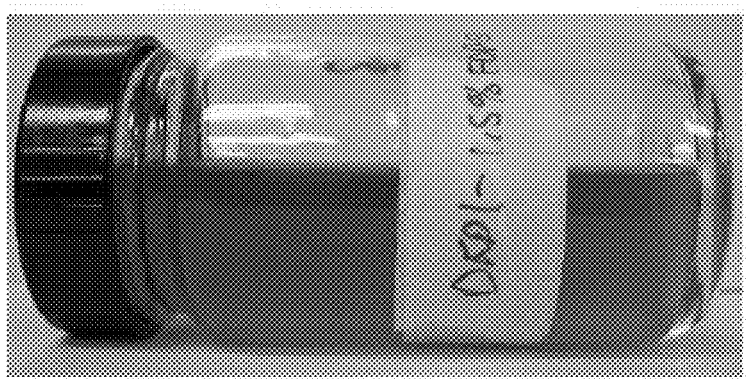
FIGS. 1A-1AA show photographs of some of the treatment fluids of Example 1 after aging at 320° F.
Figure 1B:
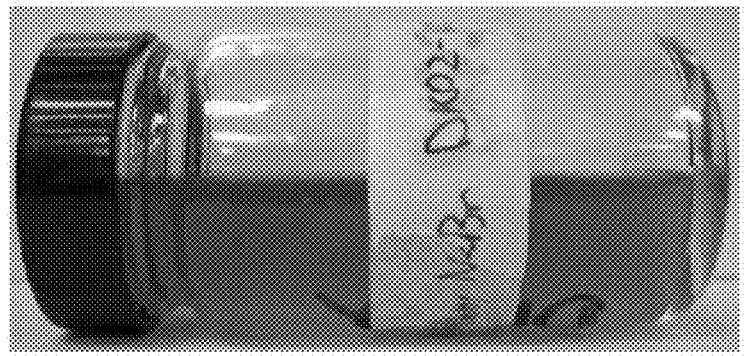
Figure 1C:
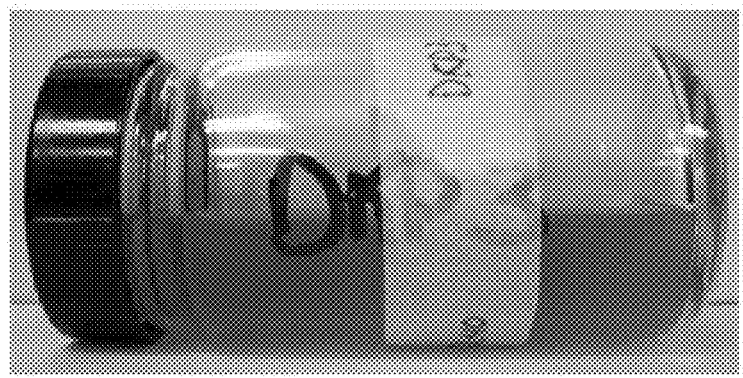
Figure 1D:
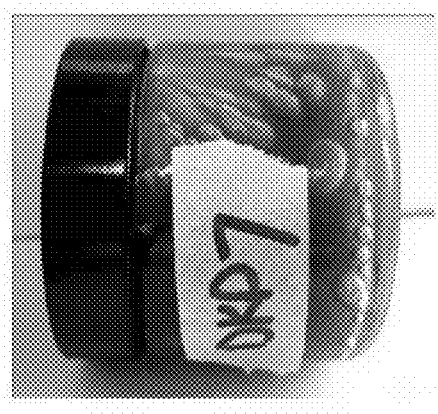
Figure 1E:
Figure 1F:
Figure 1G:
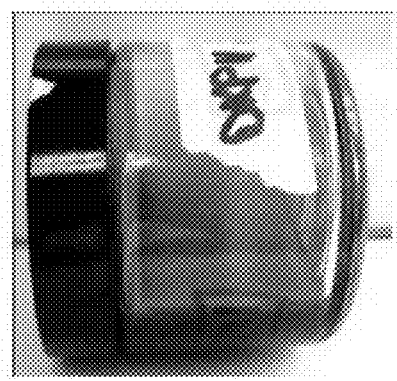
Figure 1H:
Figure 1I:
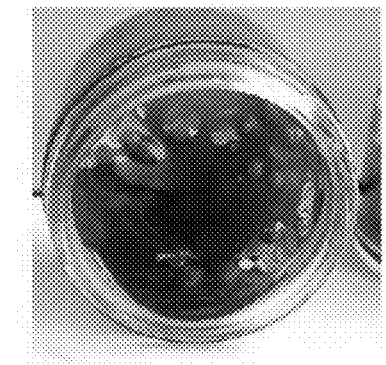
Figure 1J:
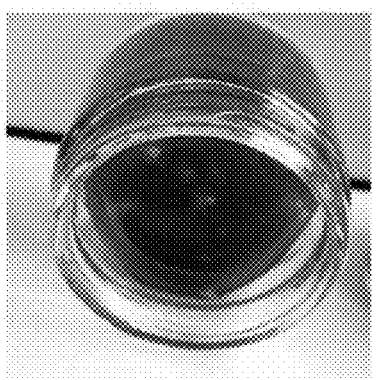
Figure 1K:
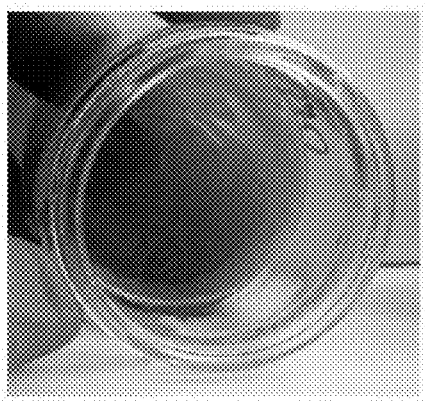
Figure 1L:
Figure 1M:
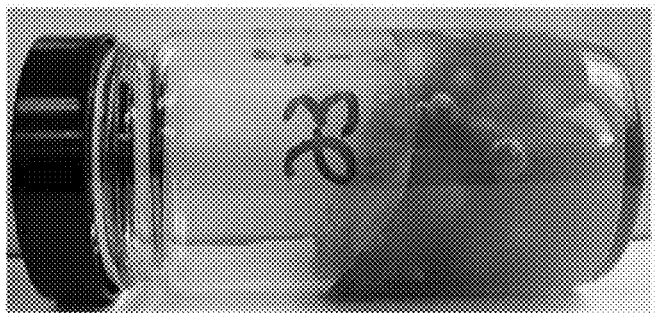
Figure 1N:
Figure 1O:
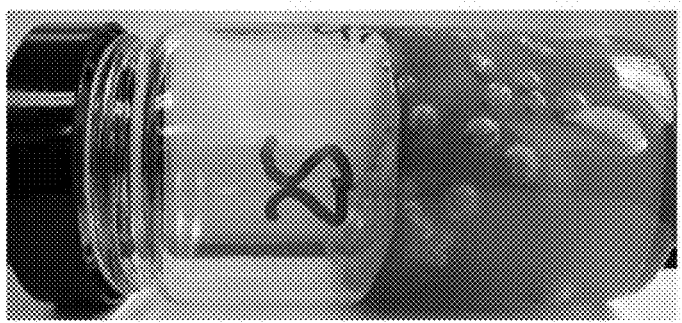
Figure 1P:
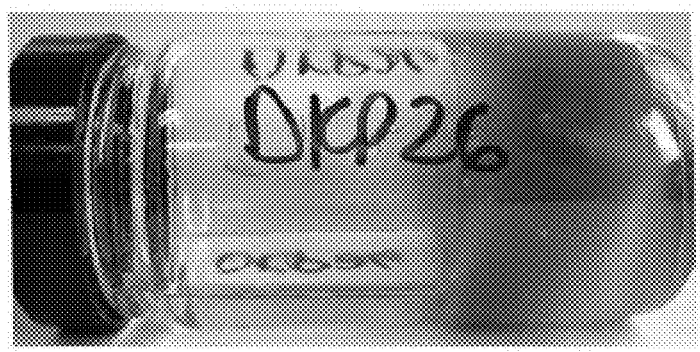
Figure 1Q:
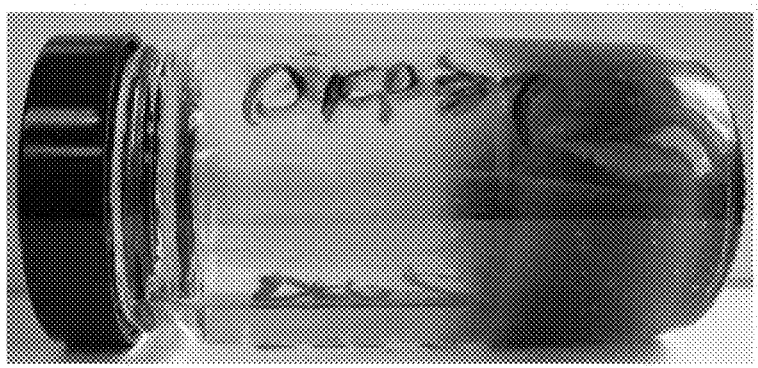
Figure 1R:

The present invention generally relates to the use of gellable treatment fluids in subterranean operations, and, more specifically, to the use of gellable treatment fluids that can remain in a gelled state for an extended period of time at high formation temperatures.

The present disclosure utilizes gellable treatment fluids that form thermally stable gels in a subterranean formation that can persist for extended periods of time at high formation temperatures (e.g., greater than about 275° F.). More particularly, the gellable treatment fluids of the present disclosure can comprise a terpolymer that comprises 2-acrylamido-2-methylpropanesulfonic acid, acrylamide, and acrylic acid monomer units or any of its salts and crosslinking agent, where the terpolymer and the crosslinking agent form a gel downhole and the gellation can be initiated or accelerated by the formation temperature. The crosslinking rate can be further accelerated or decelerated, as desired, by using gellation accelerators or retarders, respectively, such that the gel can be formed in a desired location within the subterranean formation. Since the treatment fluids can be introduced to the subterranean formation in an ungelled state, significant issues due to friction pressure are not typically encountered. Once in the subterranean formation, the gellable treatment fluids can form a crosslinked gel therein that does not flow under in situ stress after placement. As used herein, the term "in situ stress" refers to shearing forces present within a subterranean formation, including, for example, manmade shear produced during subterranean operations and naturally occurring shear forces present within the subterranean formation. The crosslinked gels of the current embodiments are to be distinguished from other uses of the present terpolymer in subterranean operations, where a linear gel results from treatment with the crosslinking agent, but the gel remains sufficiently fluid that it does flow under low shear stress and is readily pumped downhole. In some embodiments, formation of a crosslinked gel can be promoted by using higher concentrations of crosslinking agent than have typically been employed with the above terpolymer. In some embodiments, the terpolymer can become fully crosslinked in the presence of a crosslinking agent. As used herein, the terms "full crosslinking," "complete crosslinking," and grammatical equivalents thereof will refer to an amount of crosslinking that achieves a viscosity that cannot be substantially further increased by increasing the amount of crosslinking agent.

We have discovered that gels formed using the above terpolymer can have surprisingly high thermal stabilities over extended periods of time, which can make them suitable for subterranean operations in which it is desirable to at least partially block the flow of fluids in the subterranean formation for a period of days to weeks at elevated formation temperatures. In particular, in certain cases, the present treatment fluids containing the terpolymer can maintain a stable gel state for at least about 20 days at a temperature of 320° F. It believed that there has been no recognition in prior uses of this terpolymer that a gel can be made stable for a period of days to weeks, particularly at high formation temperatures. The extended thermal stability of the gels allows the present treatment fluids to be used as kill pills and perforation pills for impeding the flow of fluids, particularly formation fluids, within a subterranean formation. In addition, the present treatment fluids can be used for long-term fluid loss control applications for similar reasons. In some embodiments, the present treatment fluids can likewise be used in workover fluid applications.

In applications for blocking or diverting the flow of fluids within a subterranean formation, the present treatment fluids can make use of a higher concentration of crosslinking agent than has conventionally been used in the art. It is believed that these higher crosslinking agent concentrations can produce a crosslinked gel that is more completely crosslinked than is achieved at lower crosslinking agent concentrations. Although the present treatment fluids can utilize any concentration of the crosslinking agent, the concentration is most typically about 1 wt. % relative to water or above. At these crosslinking agent concentrations, it is believed that the treatment fluids can form a crosslinked gel downhole that does not flow under shear stress and is suitable for at least partially blocking or diverting the flow of fluids therein. In contrast, at conventional crosslinking agent concentrations of about 0.7 wt. % relative to water or below, it is believed that linear gels can form that remain pumpable and do flow when subjected to a shearing force. The above concentrations refer to the concentration of a crosslinking agent composition containing a crosslinking agent, rather than the concentration of active crosslinking agent. In contrast to crosslinked gels, linear gels are believed to lack sufficient strength needed to block fluid flow within a subterranean formation for extended periods of time. Furthermore, linear gels are believed to have significantly more potential for damaging a subterranean formation due to their greater likelihood of penetrating the formation matrix. In contrast, the present crosslinked gels are believed to simply lift off from the formation matrix with little to no penetration occurring, thereby presenting a much lower likelihood of formation damage once production is allowed to resume.

The present treatment fluids can also have the further advantage of not significantly altering the regain permeability of the subterranean formation after the gel breaks. As used herein, the term "regain permeability" refers to the propensity of a fluid to flow through a subterranean formation after a gel that blocks fluid flow has been broken or removed. In some embodiments, the present treatment fluids, when gelled, can effectively block fluid flow in a core sample, and after breaking or removing the gel, fluid can again flow through the core sample at nearly the same rate as before the gel was applied thereto. That is, it is believed that the present treatment fluids can be substantially non-damaging to a subterranean formation after breaking of the gel.

As a further advantage, gels formed from the present treatment fluids can be allowed to break at their native rate without using a breaker, if desired, in some embodiments. In some embodiments, the native break rate of the gel can be changed by altering the composition of the gel formulation in the absence of a breaker. In alternative embodiments, a breaker or delayed-release breaker can be used to break the gel, if desired. Accordingly, the present treatment fluids can be utilized over a wide range of times in subterranean operations.

As a still further advantage, the present treatment fluids are not believed to be overly corrosive to metal parts. Accordingly, during long downhole residence times, the treatment fluids are not believed to be significantly damaging to metallic tools or drill string components used during downhole operations.

When the present treatment fluids are left downhole for an extended period of time, it can sometimes be desirable to include one or more gel stabilizers in the treatment fluid to increase the long term thermal stability of the gel. In some embodiments, suitable gel stabilizers can comprise one or more antioxidants that increase the chemical stability of the terpolymer. Without being bound by any theory or mechanism, it is believed that inclusion of an antioxidant in the treatment fluids can limit oxidative damage to the terpolymer that can otherwise occur over extended periods of time at high temperatures. Oxidative damage can include polymer chain scission, for example, which can reduce the ability of the terpolymer to form a gel. In some cases, extended exposure to high temperatures can be damaging to the antioxidant itself, which can limit its ability to protect the terpolymer from oxidative damage.

In some embodiments, methods described herein can comprise providing a treatment fluid comprising an aqueous carrier fluid, a crosslinking agent, a gel stabilizer, and a terpolymer that comprises 2-acrylamido-2-methylpropanesulfonic acid, acrylamide, and acrylic acid monomer units, or any salt thereof; introducing the treatment fluid into a subterranean formation; allowing the treatment fluid to form a gel in the subterranean formation; and breaking the gel after it has been in the subterranean formation for at least about one day.

In some embodiments, methods described herein can comprise providing a treatment fluid comprising an aqueous carrier fluid, a crosslinking agent, a gel stabilizer, and a terpolymer that comprises 2-acrylamido-2-methylpropanesulfonic acid, acrylamide, and acrylic acid monomer units, or any salt thereof; introducing the treatment fluid into a subterranean formation; allowing the treatment fluid to form a gel in the subterranean formation that at least partially blocks the flow of formation fluids in at least a portion of the subterranean formation; and breaking the gel after it has been in the subterranean formation for at least about one day.

In some embodiments, methods described herein can comprise providing a treatment fluid comprising an aqueous carrier fluid, a crosslinking agent, and a terpolymer that comprises 2-acrylamido-2-methylpropanesulfonic acid, acrylamide, and acrylic acid monomer units, or any salt thereof; introducing the treatment fluid into a subterranean formation; and allowing the treatment fluid to form a crosslinked gel in the subterranean formation that, after formation, does not flow under in situ stress within the subterranean formation. In some embodiments, the crosslinked gel can at least partially block the flow of formation fluids in at least a portion of the subterranean formation. In some embodiments, the treatment fluid can further comprise a gel stabilizer.

In some embodiments, treatment fluids described herein can completely block the flow of fluids (e.g., formation fluids) within a subterranean formation. For example, in kill pill and perforation pill applications, a complete blocking of fluid flow can be desirable.

The aqueous carrier fluid of the present embodiments can generally be from any source. In various embodiments, the aqueous carrier fluid can comprise fresh water, acidified water, salt water, seawater, brine, or an aqueous salt solution. In some embodiments, the aqueous carrier fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some embodiments, the aqueous carrier fluid can be a high density brine. As used herein, the term "high density brine" refers to a brine that has a density of about 10 lbs/gal or greater (1.2 g/cm$^3$ or greater). It is believed that the formation of gels in such high density brines can be particularly problematic due to polymer hydration issues. However, gelled treatment fluids formed from high density brines can be particularly advantageous for kill pill and other fluid loss applications due to the significant hydrostatic pressure exerted by the weight of the gel.

The terpolymer used in the present embodiments can have a composition spanning a wide range. In general, an amount of 2-acrylamido-2-methylpropanesulfonic acid monomer units in the terpolymer can range between about 10% and about 80% of the terpolymer by weight, and an amount of acrylic acid monomer units in the terpolymer can range between about 0.1% and about 10% of the terpolymer by weight, with the balance comprising acrylamide monomer units. In more particular embodiments, the terpolymer can comprise between about 55% and about 65% 2-acrylamido-2-methylpropanesulfonic acid monomer units by weight, between about 34.9% and about 44.9% acrylamide monomer units by weight, and between about 0.1% and about 10.1% acrylic acid monomer units by weight. In still more particular embodiments, the terpolymer can comprise between about 55% and about 65% 2-acrylamido-2-methylpropanesulfonic acid monomer units by weight, between about 34.9% and about 49.9% acrylamide monomer units by weight, and between about 0.1% and about 5.1% acrylic acid monomer units by weight.

In various embodiments, an amount of the terpolymer in the present treatment fluids can range between 0.1 wt. % and about 2.6 wt. % relative to water of the treatment fluid. In some embodiments, an amount of the terpolymer can range between about 0.9 wt. % relative to water and about 2.6 wt. % relative to water of the treatment fluid. In some embodiments, an amount of the terpolymer can range between about 1.3 wt. % relative to water and about 2.6 wt. % relative to water of the treatment fluid.

A variety of crosslinking agents can be used in accordance with the present embodiments. In some embodiments, the crosslinking agent can be a metal ion. Metal ions suitable to serve as crosslinking agents in the present embodiments can include, for example, titanium (IV) ions, zirconium (IV) ions, chromium (III) ions, cobalt (III) ions, aluminum (III) ions, hafnium (III) ions, and the like. In some embodiments, the crosslinking agent can comprise zirconyl chloride or zirconyl sulfate. In some embodiments, a metal ion-releasing compound such as a coordination compound can be used. In some embodiments, the crosslinking agent can be an organic crosslinking agent such as, for example, a diamine, dithiol or a diol. In some embodiments, the crosslinking agent can be an organic polymer such as, for example, a polyester, a polyalkyleneimine (e.g., polyethyleneimine) or a polyalkylenepolyamine. Having the benefit of the present disclosure and knowing the temperature and chemistry of a subterranean formation of interest, one having ordinary skill in the art will be able to choose a crosslinking agent and amount thereof suitable for producing a desired gel time and viscosity.

In some embodiments, mixtures of crosslinking agents can be used to achieve a desired rate of crosslinking. For example, in some embodiments, a crosslinking agent that produces a slower rate of crosslinking can be added as a gellation retarder, and in other embodiments, a crosslinking agent that produces a faster rate of crosslinking can be added as a gellation accelerator. In some embodiments, a gellation retarder or a gellation accelerator can, respectively, increase or decrease the temperature at which gellation takes place. In some embodiments, a metal ion-containing crosslinking agent can contain various concentrations of acetate and lactate, which will determine whether the added crosslinking agent serves as a gellation retarder or a gellation accelerator. Appropriate amounts of acetate and lactate ions to be added to a metal ion-containing crosslinking agent to serve as either a gellation retarder or gellation accelerator can be determined through routine experimentation by one having ordinary skill in the art. Other agents that can be added to control the rate and/or temperature of gellation can include, for example, other α-hydroxy acids (e.g., glycolic acid, tartaric acid and the like), diols and polyols.

Generally, the crosslinking agent is present in the current treatment fluids in an amount sufficient to provide a desired degree of crosslinking of the terpolymer. In some embodiments, the amount of crosslinking agent present can be sufficient to achieve complete crosslinking, although incomplete crosslinking may be more preferable in other embodiments. In some embodiments, an amount of the crosslinking agent in the treatment fluid can be at least about 1 wt. % relative to water or above in the treatment fluid. In other embodiments, an amount of the crosslinking agent can be at least about 0.9 wt. % relative to water or above in the treatment fluid. In still other embodiments, an amount of the crosslinking agent in the treatment fluid can be at least about 0.8 wt. % relative to water or above in the treatment fluid. In some embodiments, an amount of the crosslinking agent can range between about 1 wt. % and about 2 wt. % relative to water in the treatment fluid or between about 1 wt. % and about 1.6 wt. % relative to water in the treatment fluid.

In order to form a gel having a suitable temperature stability and viscosity profile, an amount of the terpolymer to the crosslinking agent is typically maintained at a concentration ratio of at most about 10:1. In some embodiments, an amount of the terpolymer to the crosslinking agent can be maintained at a concentration ratio of at most about 6:1. In some embodiments, a concentration ratio of the terpolymer to the crosslinking agent can range between about 6:1 and about 2:1. In other embodiments, a concentration ratio of the terpolymer to the crosslinking agent can range between about 6:1 and about 1:1.

In some embodiments, the present treatment fluids can have a pH ranging between about 3 and about 6 prior to gel formation occurring. In other embodiments, the treatment fluids can have a pH ranging between about 3 and about 5. In still other embodiments, the treatment fluids can have a pH ranging between about 4.2 and about 4.8. In some embodiments, the present treatment fluids can further comprise a buffer to maintain the pH of the treatment fluid within a desired range, including within any of the above ranges. When used, the buffer should be chosen such that it does not interfere with the formation of a gel within the subterranean formation. In various embodiments, a concentration of the buffer can range between about 0.1 wt. % and about 1 wt. % of the treatment fluid. In some embodiments, the pH of the treatment fluid can be further adjusted with a pH-modifying agent such as, for example, an acid or a base. Reasons why one would want to adjust the pH of the treatment fluid can include, for example, to adjust the rate of hydration of the terpolymer, to activate the crosslinking agent, to improve the properties of the gel formed from the copolymer, to adjust the rate of gellation of the terpolymer, and any combination thereof. In addition, the pH of the treatment fluid can influence the rate at which breakers, particularly delayed-release breakers, are operable to break the gel formed from the terpolymer.

In high temperature formations having a temperature of about 280° F. or greater, the present treatment fluids can undergo gellation simply by exposure to the formation temperatures. In subterranean formations having a temperature of about 200° F. to about 275° F., it can be more desirable, and oftentimes necessary, to accelerate the gellation rate by formulating the crosslinking agent as a gellation accelerator. At these lower temperatures, the gellation rate can either be sluggish, or a gel can fail to form. In such lower temperature formations, divalent brines can be particularly suitable for forming the gellable treatment fluid. Divalent brines, but not monovalent brines, can sometimes be incompatible with the terpolymer due to precipitation and other instability issues, particularly as the formation temperature approaches and exceeds 300° F. Under these conditions, the gel can experience mechanical failure in a very short time in the presence of a divalent brine. At lower formation temperatures (e.g., less than about 250° F.), however, divalent brines can be successfully used with the terpolymer without substantial precipitation occurring. As previously noted, crosslinking can be extremely slow to non-existant at these lower temperatures. Use of a gellation accelerator to accelerate the crosslinking rate can enable the use of divalent brines in these embodiments.

In some embodiments, the present methods can comprise breaking the gel in the subterranean formation, most typically after the gel has been in the subterranean formation for at least about one day. In some embodiments, the treatment fluid can be formulated such that the gel breaks at the formation temperature at a desired time. That is, in such embodiments, the gel can be broken without adding a breaker or including a breaker in the treatment fluid. Knowing the temperature and chemistry of the subterranean formation, one having ordinary skill in the art and the benefit of the present disclosure will be able to formulate a treatment fluid having a desired break time.

In other embodiments, the present methods can further comprise treating the gel with a breaker. In some embodiments, the breaker can be added to the gel within a separate treatment fluid. A wide variety of suitable breakers are well known to one having ordinary skill in the art. In some embodiments, the breaker can be an oxidizer such as, for example, sodium bromate, sodium chlorate or manganese dioxide. In some embodiments, the breaker can comprise a treatment fluid having a pH of about 7 or greater, which can cause gels formed from the present treatment fluids to collapse. In some embodiments, the breaker can be present in the treatment fluid as a delayed-release breaker. In some embodiments, a breaker can be formulated for delayed release by encapsulating the breaker in a material that is slowly soluble or slowly degradable in the treatment fluid or the gel formed therefrom. Illustrative materials that can be used for encapsulation can include, for example, porous materials (e.g., precipitated silica, alumina, zeolites, clays, hydrotalcites, and the like), EPDM rubber, polyvinylidene chloride, polyamides, polyurethanes, crosslinked and partially hydrolyzed acrylate polymers, and the like. In some embodiments, degradable polymers can be used to encapsulate a breaker. In some embodiments, a suitable breaker for use with the present treatment fluids can be "VICON FB," which is a breaker available from Halliburton Energy Services.

In some embodiments, the present treatment fluids can be used in a subterranean formation having a temperature of up to about 400° F. In some embodiments, the present treatment fluids can be used in a subterranean formation having a temperature of up to about 350° F. In some embodiments, the present treatment fluids can be used in a subterranean formation having a temperature of up to about 320° F. In some embodiments, the present treatment fluids can be used in a subterranean formation having a temperature ranging between about 100° F. and about 350° F. In some embodiments, the present treatment fluids can be used in a subterranean formation having a temperature ranging between about 150° F. and about 350° F. In some embodiments, the present treatment fluids can be used in a subterranean formation having a temperature ranging between about 200° F. and about 350° F. In some embodiments, the present treatment fluids can be used in a subterranean formation having a temperature ranging between about 250° F. and about 350° F. In some embodiments, the present treatment fluids can be used in a subterranean formation having a temperature ranging between about 275° F. and about 350° F. In some embodiments, the present treatment fluids can be used in a subterranean formation having a temperature ranging between about 300° F. and about 350° F. In some embodiments, the present treatment fluids can be used in a subterranean formation having a temperature ranging between about 320° F. and about 350° F. In some embodiments, the treatment fluids can be used in a subterranean formation having a temperature ranging between about 300° F. and about 400° F.

Depending on the function that the present treatment fluids are performing, one having ordinary skill in the art will be able to determine an appropriate length of time for the gel to remain in the subterranean formation prior to being broken. In some embodiments, gels formed from the present treatment fluids can be broken after the gel has been in the subterranean formation for at least about one day. In some embodiments, the gel can be broken after at least about two days in the subterranean formation, or after at least about three days in the subterranean formation, or after at least about four days in the subterranean formation, or after at least about five days in the subterranean formation, or after at least about seven days in the subterranean formation, or after at least about ten days in the subterranean formation, or after at least about fifteen days in the subterranean formation, or after at least about twenty days in the subterranean formation, or after at least about twenty-five days in the subterranean formation, or after at least about thirty days in the subterranean formation. In some embodiments, the gel can be broken after being in the subterranean formation for a time ranging between about one day and about two days, or between about two days and about three days, or between about three days and about four days, or between about four days and about five days, or between about five days and about seven days, or between about seven days and about ten days, or between about ten days and about fifteen days, or between about fifteen days and about twenty days, or between about twenty days and about thirty days. In some embodiments, the foregoing ranges represent the native break rate of the gel without adding an external breaker. In other embodiments, the foregoing ranges represent the time that the gelled state is allowed to remain intact within the subterranean formation before breaking the gel with an external breaker.

In some subterranean operations, it can be desirable to leave the gels in the subterranean formation for a shorter length of time. In some embodiments, gels formed from present treatment fluids can be allowed to remain in the subterranean formation for less than about one day. For example, the gels can be allowed to remain in the subterranean formation for about 16 hours or less, or about 14 hours or less, or about 12 hours or less, or about 10 hours or less, or about 8 hours or less, or about 6 hours or less, or about 4 hours or less, or about 2 hours or less before being broken.

In some embodiments, treatment fluids described herein can comprise a gel stabilizer such as, for example, one or more antioxidants. When the formation temperature is high and/or when the gel formed from the treatment fluid is allowed to remain in the subterranean formation for extended periods of time, it can be especially beneficial to include one or more antioxidants in the treatment fluid to maintain the rheological and chemical stability of the gel. In some embodiments, other beneficial effects of including an antioxidant can be realized as well. For example, in some embodiments, the degree of crosslinking can be altered by including or excluding certain antioxidants. If the degree of crosslinking is altered by the inclusion or exclusion of an antioxidant, the ratio of the terpolymer to the crosslinking agent can be adjusted, if desired, to achieve a desired degree of crosslinking in the gel.

In some embodiments, suitable antioxidants can include, for example, a sulfite salt (e.g., sodium sulfite), ascorbic acid, erythorbic acid, a hydroquinone, any salt thereof, any derivative thereof, or any combination thereof. Other suitable antioxidants can be envisioned by one having ordinary skill in the art. For example, in some embodiments, other suitable antioxidants can include, for example, tannic acid, gallic acid, propyl gallate, thiols, and the like. In some embodiments, certain antioxidants can themselves be degraded by extended residence times in high temperature subterranean formations. In some embodiments, an antioxidant containing ascorbic acid, erythorbic acid, any salt thereof, any derivative thereof, or any combination thereof can be further combined with a hydroxylamine to further increase its temperature stability. In some embodiments, a suitable hydroxylamine compound for use in high temperature subterranean formations can be isopropylhydroxylamine. It is to be recognized that other hydroxylamine compounds can also be used in place of isopropylhydroxylamine, if desired. Generally, it is contemplated that any hydroxylamine compound having a molecular weight of less than about 400 can be used in the present embodiments. When used, a ratio of the hydroxylamine compound to the ascorbic acid and/or erythrobic acid, or salt or derivative thereof, can range between about 1:1 and about 3:1. In some embodiments, the hydroxylamine compound and the ascorbic acid and/or erythorbic acid, or salt or derivative thereof, can be blended in an aqueous fluid.

In addition to the foregoing materials, it can also be desirable, in some embodiments, for other components to be present it the treatment fluid. Such additional components can include, without limitation, particulate materials, fibrous materials, bridging agents, weighting agents, proppants, gravel, corrosion inhibitors, catalysts, clay control stabilizers, biocides, bactericides, friction reducers, gases, surfactants, solubilizers, salts, scale inhibitors, corrosion inhibitors, foaming agents, anti-foaming agents, iron control agents, and the like.

To facilitate a better understanding of the present invention, the following examples of preferred embodiments are given. In no way should the following examples be read to limit, or to define, the scope of the invention.

EXAMPLES

Example 1

Preparation of Gellable Treatment Fluids Comprising a Terpolymer of 2-acrylamido-2-methylpropanesulfonic Acid, Acrylamide and Acrylic Acid Monomer Units Treatment fluids of this example were formulated in a NaBr brine diluted with deionized water to produce a brine density that was generally 12.4 lb/gal unless otherwise noted. A mixture containing a 50 wt. % mineral oil dispersion of a terpolymer of a sodium salt of 2-acrylamido-2-methylpropanesulfonic acid, acrylamide, and acrylic acid was prepared by adding the terpolymer to the brine with rapid stirring to produce a desired terpolymer concentration. The terpolymer became fully hydrated within about 60 seconds using a low to moderate applied shear. Care was taken not to entrain excess air in the mixture, since air bubbles in the gelled treatment fluid can promote oxidative degradation during high temperature aging (see below).

After polymer hydration had taken place, the pH of the treatment fluid was adjusted to approximately 3 through the addition of 0.45 vol. % of a 15% wt./vol. sulfamic acid solution to the treatment fluid. Thereafter, various amounts of "CL-40" (a Zr (IV) crosslinking agent composition containing 70-90% active crosslinking agent that is available from Halliburton Energy Services) were added to the treatment fluids, followed by varying amounts of additional additives such as sodium erythorbate, sodium erythorbate/isopropylhydroxylamine, sodium sulfite, and/or hydroquinone. After all components had been added, the pH was adjusted a second time with the 15% wt./vol. sulfamic acid solution to produce a final pH ranging between 4.2 and 4.8, unless otherwise noted. The formulations of the treatment fluids prepared according to this Example are summarized in Table 1 below. Crosslinking agent concentrations in Table 1 refer to the concentration of the crosslinking agent composition, rather than that of active crosslinking agent. The calculated concentration ratio of the terpolymer to the crosslinking agent is based on the amount of crosslinking agent composition, rather than the concentration of active crosslinking agent.

TABLE 1

| Treatment Fluid Formulations[1,2] | | | | | | | |
|---|---|---|---|---|---|---|---|
| Treatment Fluid | V/V % Terpolymer | V/V % Crosslinking Agent | Concentration Ratio of Terpolymer/ Crosslinking Agent | Adjusted pH | W/V % Sodium Erythorbate | Sodium Erythorbate/ IPHA[3] | (Other) |
| 1 | 1.5 | 0.19 | 8 | 3.39 | 0.11 | — | — |
| 2 | 1.5 | 0.17 | 9 | 3.26 | 0.11 | — | — |
| 3 | 1.5 | 0.15 | 10 | 3.96 | 0.11 | — | — |
| 4 | 3.0 | 0.3 | 10 | 3.46 | 0.11 | — | — |
| 5 | 3.0 | 0.33 | 8 | 3.96 | 0.11 | — | — |
| 6 | 3.0 | 0.22 | 9 | 4.03 | 0.11 | — | — |
| 7 | 2.25 | 0.22 | 10 | 3.42 | 0.11 | — | — |
| 8 | 3.0 | 0.15 | 20 | 3.74 | 0.11 | — | — |
| 9 | 3.0 | 0.10 | 30 | 3.65 | 0.11 | — | — |
| 10 | 3.0 | 0.3 | 10 | 4.01 | 0.11 | — | — |
| 11 | 3.0 | 0.3 | 10 | 2.18 | 0.11 | — | citric acid (1 ppb[4]) |
| 12 | 3.0 | 0.43 | 7 | 4.38 | 0.11 | — | — |
| 13 | 3.0 | 0.5 | 6 | 4.69 | 0.11 | — | — |
| 14 | 3.0 | 0.5 | 6 | 3.18 | 0.3 | — | — |
| 15 | 3.0 | 0.5 | 6 | 3.18 | 0.6 | — | — |
| 16 | 3.0 | 0.5 | 6 | 3.18 | 0.9 | — | — |
| 17 | 3.0 | 0.5 | 6 | 3.18 | 0.11 | — | hydroquinone (1 ppb) |
| 18 | 3.0 | 0.5 | 6 | 3.18 | 0.11 | — | hydroquinone (3 ppb) |
| 19 | 3.0 | 0.75 | 4 | 2.8 | 0.11 | — | — |
| 20 | 3.0 | 0.75 | 4 | 4.12 | 0.11 | (2 ppb) | — |
| 21 | 3.0 | 1.5 | 2 | 3.12 | 0.11 | — | — |
| 22 | 3.0 | 1.5 | 2 | 3.12 | 0.6 | — | — |
| 23 | 3.0 | 1.5 | 2 | 3.12 | 0.11 | (2 ppb) | — |
| 24 | 3.0 | 1.5 | 2 | 3.12 | 0.11 | — | hydroquinone (2 ppb) |
| 25 | 3.0 | 1.5 | 2 | 3.12 | 0.11 | — | — |

TABLE 1-continued

Treatment Fluid Formulations[1,2]

| Treatment Fluid | V/V % Terpolymer | V/V % Crosslinking Agent | Concentration Ratio of Terpolymer/ Crosslinking Agent | Adjusted pH | W/V % Sodium Erythorbate | Sodium Erythorbate/ IPHA[3] | (Other) |
|---|---|---|---|---|---|---|---|
| 26 | 3.0 | 1.5 | 2 | 3.12 | 0.6 | — | hydroquinone (2 ppb) |
| 27 | 3.0 | 1.5 | 2 | — | 0.11 | — | — |
| 28 | 3.0 | 0.5 | 6 | 3.81 | 0.11 | (2 ppb) | sodium sulfite (1 ppb) |
| 29 | 3.0 | 0.75 | 4 | 4.12 | 0.11 | (2 ppb) | sodium sulfite (1 ppb) |
| 30 | 3.0 | 1.0 | 3 | 3.71 | 0.11 | (2 ppb) | sodium sulfite (1 ppb) |
| 31 | 2.0 | 0.5 | 4 | 4.18 | — | (2 ppb) | sodium sulfite (1 ppb) |
| 32 | 2.0 | 0.75 | 2.6 | 3.6 | — | (2 ppb) | sodium sulfite (1 ppb) |
| 33 | 2.0 | 1.0 | 2 | 3.1 | — | (2 ppb) | sodium sulfite (1 ppb) |
| 34 | 3.0 | 1.0 | 3 | 3.8 | — | (1 ppb) | sodium sulfite (0.5 ppb) |
| 35 | 3.0 | 1.0 | 3 | 3.8 | 0.3 | (1 ppb) | sodium sulfite (0.5 ppb) |
| 36 | 3.0 | 0.95 | 3.15 | 5.35 | — | (1 ppb) | sodium sulfite (0.5 ppb) |
| 37 | 3.0 | 0.9 | 3.3 | 5.55 | — | (1 ppb) | sodium sulfite (0.5 ppb) |
| 38 | 3.0 | 0.85 | 3.5 | 5.6 | — | (1 ppb) | sodium sulfite (0.5 ppb) |
| 39 | 3.0 | 0.95 | 3.15 | 4.6 | — | (1 ppb) | sodium sulfite (0.5 ppb) |
| 40 | 3.0 | 0.9 | 3.3 | 4.55 | — | (1 ppb) | sodium sulfite (0.5 ppb) |
| 41 | 3.0 | 0.85 | 3.5 | 4.75 | — | (1 ppb) | sodium sulfite (0.5 ppb) |
| 42 | 3.0 | 0.75 | 4 | 4.06 | — | (1 ppb) | sodium sulfite (0.5 ppb) |
| 43 | 3.0 | 0.65 | 4.6 | 3.97 | — | (1 ppb) | sodium sulfite (0.5 ppb) |
| 44 | 3.0 | 0.55 | 5.4 | 3.88 | — | (1 ppb) | sodium sulfite (0.5 ppb) |
| 45 | 3.0 | 1.2 | 2.5 | 5.64 | — | (1.4 ppb) | sodium sulfite (1.4 ppb) |
| 46 | 3.0 | 1.0 | 3 | 4.98 | — | (0.5 ppb) | sodium sulfite (0.5 ppb) |
| 47 | 3.0 | 1.0 | 3 | 4.85 | — | (0.5 ppb) | sodium sulfite (0.5 ppb) |
| 48 | 3.0 | 1.0 | 3 | 4.75 | — | (0.5 ppb) | — |
| 49 | 3.0 | 1.0 | 3 | 4.75 | — | (0.5 ppb) | |

[1]All treatment fluids prepared in 12.4 lb/bbl NaBr brine, except for treatment fluids 1-3, which were prepared in 12.0 lb/bbl NaBr brine.
[2]Some treatment fluids in Table 1 are duplicate formulations used for comparative testing outlined below.
[3]IPHA = isopropylhydroxylamine
[4]ppb = lbs/bbl

Example 2

Gellation of the Treatment Fluids

Prior to gellation, the treatment fluids prepared as above were either allowed to rest overnight or were placed in a reduced pressure environment to reduce entrained air therein. Thereafter, aliquots of the treatment fluids were transferred to glass jars and placed in stainless steel aging cells, which were then sealed and purged with nitrogen gas several times before pressurizing to 500 psi and heating in an oven at 320° F. to promote gellation. After a pre-determined aging time, the aging cells were removed from the oven, rapidly cooled, depressurized and opened. Each sample was assayed qualitatively for gel viscosity and other properties by either turning the jar on its side or upside down and noting the gel's resistance to flow. FIGS. 1A-1AA show photographs of some of the treatment fluids of Example 1 after aging at 320° F. The photographs provide a qualitative measure of the stability of the gel formed during high temperature aging.

Treatment fluids 1-3 in which the concentration ratio of the terpolymer to the crosslinking agent was greater than 10 did not form gels in 12.4 lb/bbl NaBr brine. Between a terpolymer:crosslinking agent ratio of 10:1 and 4:1 gels of progressively increasing strength were formed (treatment fluids 5, 6, 12 and 13). At a terpolymer:crosslinking agent ratio of 4:1 some slight syneresis was observed (treatment fluid 19). At a terpolymer:crosslinking agent ratio of 2:1 an even greater amount of syneresis was observed (treatment fluid 21).

Once the conditions for forming a gel had been established, attention turned toward conferring additional thermal stability to the gels. To this end, varying amounts of sodium erythorbate/isopropylhydroxylamine, hydroquinone and/or sodium sulfite were added to the treatment fluids. At the concentrations tested, addition of these antioxidants to the treatment fluids did not significantly interfere with gel formation. The elimination of sodium erythorbate as a single component from the treatment fluid did have a profound impact on gel formation, however. As shown for treatment fluids 31-33, syneresis increased dramatically after elimination of sodium erythorbate as a singular component. It is believed that sodium erythorbate can interfere with the crosslinking reaction to produce a lower crosslink density. At lower concentrations of sodium erythorbate, particularly in combination with other gel stabilizers such as isopropylhydroxylamine, the influence on crosslink density can be less substantial. Similar syneresis behavior was seen in treatment fluids 39-41, where the amount of terpolymer was increased and the terpolymer:crosslinking agent concentration ratio was held in the range of 3.15 to 3.5, but the amount of sodium erythorbate/isopropylhydroxylamine and/or sodium sulfite was decreased. A reduction of the crosslinking agent amount to 0.75 wt. % in treatment fluid 42 reduced the amount of syneresis, but a further reduction of the crosslinking agent unfavorably impacted the gel consistency (treatment fluids 43 and 44).

Figure 1S:
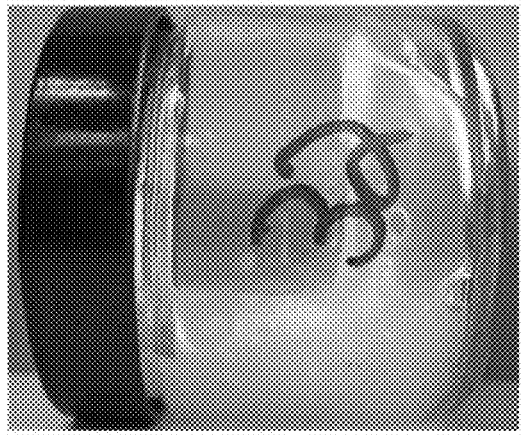
Figure 1T:
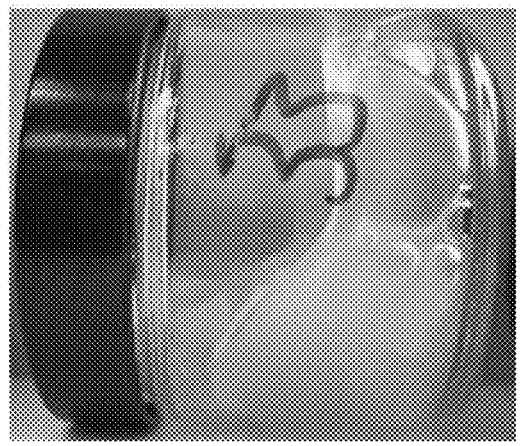
Figure 1U:
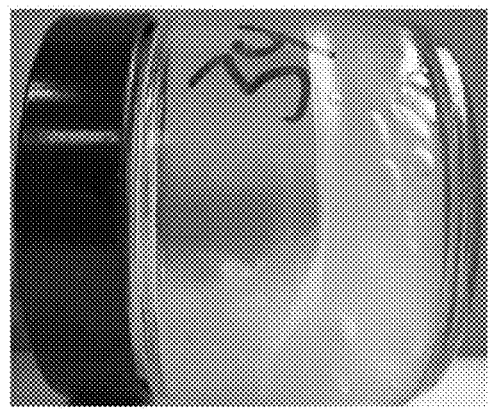
Figure 1V:
Figure 1W:
Figure 1X:
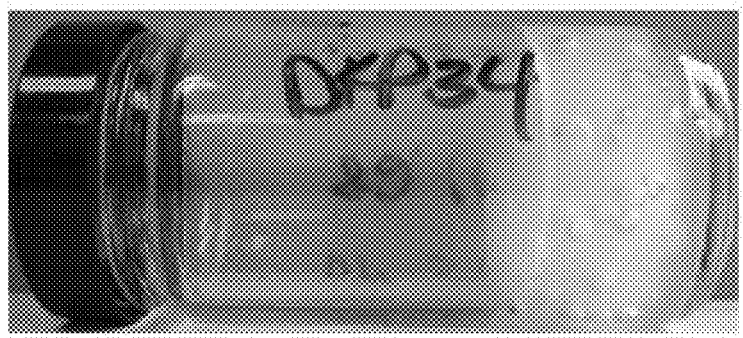
Figure 1Y:
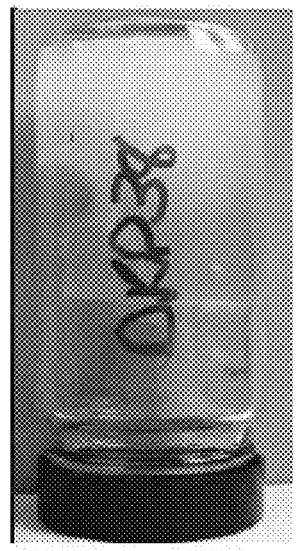
Figure 1Z:
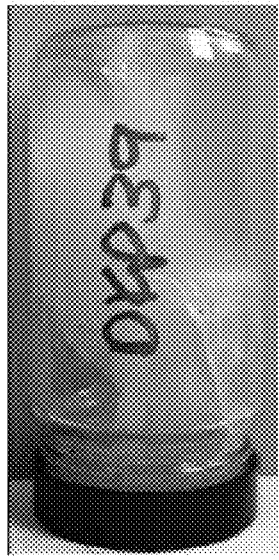
Figure 1A:
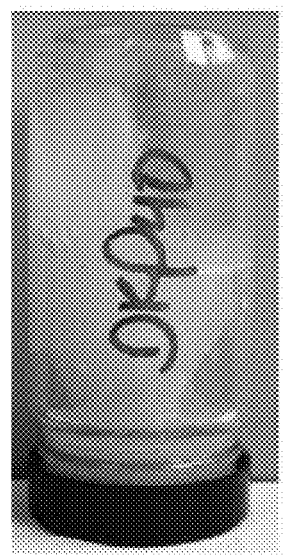

The favorable effects of pH adjustment to a range between 4.2 and 4.8 is illustrated by treatment fluids 39-41 in comparison to treatment fluids 36-38, which had identical compositions, except that a readjustment of the pH was not performed for treatment fluids 36-38. Accordingly, the latter treatment fluids had pH values ranging between 5.35 and 5.6. As shown in FIGS. 1S-1U, treatment fluids 36-38 produced much poorer quality gels.

Example 3

Rheological Measurements of the Treatment Fluids

Rheological measurements were obtained for some of the treatment fluids of Example 1 using a Fann 35 direct reading rotational viscometer. The rheological measurements were made at 120° F. at 600, 300, 200, 100, 6 and 3 rpm. The rheological properties in Fann 35 dial reading and the derived plastic viscosity (PV) and yield point (YP) are summarized in Table 2 below. PV represents the slope of the line drawn between the 600 rpm and 300 rpm dial readings. YP represents the plot of dial reading versus rotational rate extrapolated to 0 rpm (i.e., the y-intercept).

TABLE 2

| Treatment Fluid | Gelled? | Syneresis? | 600 rpm | 300 rpm | 200 rpm | 100 rpm | 6 rpm | 3 rpm | PV | YP |
|---|---|---|---|---|---|---|---|---|---|---|
| 1 | no | — | 55 | 38 | 30 | 20 | 5 | 5 | 17 | 21 |
| 2 | no | — | 57 | 38 | 32 | 20 | 5 | 4 | 19 | 19 |
| 3 | no | — | 55 | 38 | 30 | 20 | 8 | 6 | 17 | 21 |
| 4 | yes | no | 260 | 200 | 180 | 140 | 100 | 75 | 60 | 140 |
| 5 | yes | no | 165 | 115 | 95 | 70 | 25 | 25 | 50 | 65 |
| 6 | yes | no | 130 | 110 | 90 | 70 | 20 | 15 | 20 | 90 |
| 7 | no | — | 100 | 65 | 50 | 35 | 15 | 15 | 35 | 30 |
| 8 | no | — | — | — | — | — | — | — | — | — |
| 9 | no | — | — | — | — | — | — | — | — | — |
| 10 | yes | no | — | — | — | — | — | — | — | — |
| 11 | no | — | — | — | — | — | — | — | — | — |
| 12 | yes | no | 140 | 120 | 100 | 70 | 20 | 15 | 20 | 100 |
| 13 | yes | no | — | — | — | — | — | — | — | — |
| 14 | yes | no | — | — | — | — | — | — | — | — |
| 15 | yes | no | — | — | — | — | — | — | — | — |
| 16 | yes | no | — | — | — | — | — | — | — | — |
| 17 | yes | no | — | — | — | — | — | — | — | — |
| 18 | yes | no | — | — | — | — | — | — | — | — |
| 19 | yes | slight | — | — | — | — | — | — | — | — |
| 20 | yes | ND | 140 | 130 | 120 | 110 | 45 | 40 | 10 | 120 |
| 21 | yes | yes | — | — | — | — | — | — | — | — |
| 22 | yes | ND | — | — | — | — | — | — | — | — |
| 23 | yes | ND | — | — | — | — | — | — | — | — |
| 24 | yes | ND | — | — | — | — | — | — | — | — |
| 25 | yes | ND | — | — | — | — | — | — | — | — |
| 26 | yes | ND | — | — | — | — | — | — | — | — |

TABLE 2-continued

| Treatment Fluid | Gelled? | Syneresis? | Fann 35 Dial Reading | | | | | | PV | YP |
| --- | --- | --- | --- | --- | --- | --- | --- | --- | --- | --- |
| | | | 600 rpm | 300 rpm | 200 rpm | 100 rpm | 6 rpm | 3 rpm | | |
| 27 | yes | ND | — | — | — | — | — | — | — | — |
| 28 | yes | ND | 130 | 90 | 70 | 30 | 10 | 8 | 40 | 30 |
| 29 | yes | ND | 145 | 90 | 75 | 30 | 12 | 10 | 55 | 35 |
| 30 | yes | ND | 120 | 80 | 70 | 45 | 10 | 8 | 40 | 40 |
| 31 | yes | yes | 75 | 50 | 40 | 25 | 5 | 3 | 35 | 15 |
| 32 | yes | yes | 110 | 80 | 70 | 20 | 10 | 50 | 30 | 50 |
| 33 | yes | yes | 90 | 65 | 53 | 20 | 15 | 6 | 25 | 40 |
| 34 | yes | ND | — | — | — | — | — | — | — | — |
| 35 | yes | ND | — | — | — | — | — | — | — | — |
| 36 | yes | ND | — | — | — | — | — | — | — | — |
| 37 | yes | ND | — | — | — | — | — | — | — | — |
| 38 | yes | ND | — | — | — | — | — | — | — | — |
| 39 | yes | yes | — | — | — | — | — | — | — | — |
| 40 | yes | yes | — | — | — | — | — | — | — | — |
| 41 | yes? | yes | — | — | — | — | — | — | — | — |
| 42 | yes? | slight | — | — | — | — | — | — | — | — |
| 43 | yes? | ND | — | — | — | — | — | — | — | — |
| 44 | yes? | ND | — | — | — | — | — | — | — | — |
| 45 | yes? | ND | — | — | — | — | — | — | — | — |
| 46 | yes? | ND | — | — | — | — | — | — | — | — |
| 47 | yes? | ND | — | — | — | — | — | — | — | — |
| 48 | yes? | ND | — | — | — | — | — | — | — | — |
| 49 | yes? | ND | — | — | — | — | — | — | — | — |

ND = not determined

Of the treatment fluids whose viscosity was measured, the yield point was generally poorer in treatment fluids that contained sodium sulfite as an additional gel stabilizer.

Example 4

Kinetics of Gel Formation

To ensure that the gellation rate of the treatment fluids was sufficient to allow facile introduction into a subterranean formation, gellation was visually evaluated for various gellation times at 320° F. FIGS. 2A-2D show a series of photographs illustrating the gellation of treatment fluid 12 at various aging times at 320° F. FIGS. 3A-3E show a series of photographs illustrating the gellation of treatment fluid 20 at various aging times at 320° F. As shown in FIGS. 2B and 2C, a firm gel was obtained after 4 and 6 hours of heating, but after 16 hours of heating some viscosity reduction had occurred, as shown in FIG. 2D. Similar results were obtained for treatment fluid 20 (see FIGS. 3A-3E), in which sodium erythorbate/isopropylhydroxylamine was used.

Figures 4A, 4B, 4C:
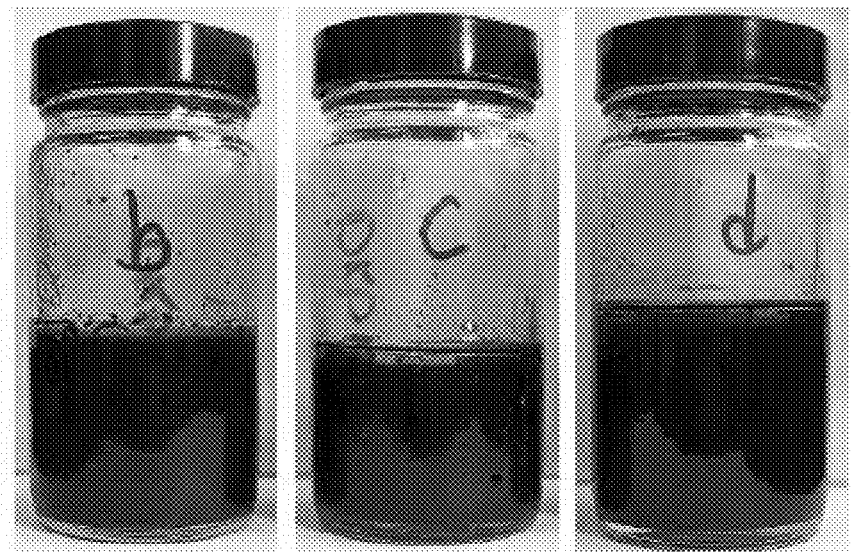
FIGS. 4A-4C show photographs of gels formed from treatment fluids 14-16 after static aging for 3 days at 320° F.
Figures 5A, 5B, 5C:
FIGS. 5A-5C show photographs of the gels formed from treatment fluids 14-16 after static aging for 5 days at 320° F.

Increasing the sodium erythorbate concentration in treatment fluids 14-16 produced a gel having better long term temperature stability. FIGS. 4A-4C show photographs of gels formed from treatment fluids 14-16 after static aging for 3 days at 320° F. As shown in FIGS. 4A-4C, the treatment fluids remained in a gelled state, in contrast to the behavior when a lower concentration of sodium erythorbate was used (see FIG. 2D). The gels remained sufficiently viscous after 3 days of static aging to support their own weight when inverted. After 2 additional days of static aging at 320° F., some losses in viscosity were observed. FIGS. 5A-5C show photographs of the gels formed from treatment fluids 14-16 after static aging for 5 days at 320° F.

Figures 6A, 6B:
FIGS. 6A and 6B show photographs of gels formed from treatment fluids 17 and 18 after static aging for 5 days at 320° F.

Addition of hydroquinone to treatment fluids 17 and 18 further improved the long term static aging properties of the gels formed from the treatment fluids. FIGS. 6A and 6B show photographs of gels formed from treatment fluids 17 and 18 after static aging for 5 days at 320° F. As shown in FIGS. 6A and 6B, hydroquinone further improved the gel stability, and the gels were able to support their own weight when inverted. Without being bound by theory or mechanism, it is believed that the increased gel stability is due to the reduction of radical-induced scission of the polymer chains when the free radical scavenger hydroquinone is present.

Efforts to actively exclude air from being entrained within the gels also led to improved gel stability. Treatment fluids 21 and 25 had substantially identical compositions. When these treatment fluids were gelled, great care was taken to actively exclude entrained air from treatment fluid 25 during blending. Upon static aging at 320° F. for 5 days, treatment fluid 25 had significantly better gel properties by visual inspection than did treatment fluid 21, where no significant efforts were made to exclude entrained air.

Figures 7A, 7B, 7C, 7D:
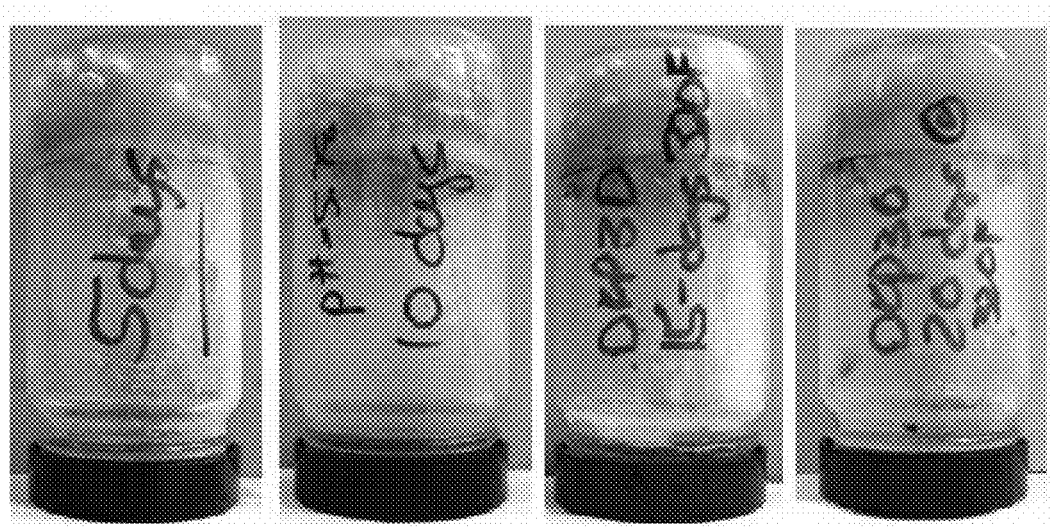
FIGS. 7A-7D show photographs of the gels formed from treatment fluid 34 after static aging for 20 days at 320° F., where each successive photograph represents an additional 5 days of static aging.

FIGS. 7A-7D show photographs of the gels formed from treatment fluid 34 after static aging for 20 days at 320° F., where each successive photograph represents an additional 5 days of static aging. For this static aging experiment, sodium erythorbate was omitted from the treatment fluid due to its propensity to inhibit crosslinking. In addition, care was taken to prevent air from being entrained in the gel. As shown in FIGS. 7A-7D, the gel retained its viscosity over 20 days of static aging. Some syneresis was evident after 5 and 10 days of static aging (FIGS. 7B and 7C).

Figure 8:
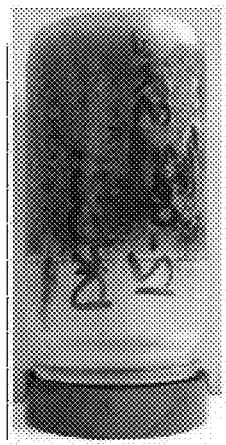
FIG. 8 shows a photograph of a gel formed from treatment fluid 35 after 15 days of static aging at 320° F.

FIG. 8 shows a photograph of a gel formed from treatment fluid 35 after 15 days of static aging at 320° F. Treatment fluid 35 had the same formulation as treatment fluid 34, except that 1 lb/bbl sodium erythorbate was included in treatment fluid 35. As shown in FIG. 8, the gel strength of treatment fluid 35 was impacted slightly by inclusion of the sodium erythorbate, but the long term gel stability appeared to have been impacted only minimally.

Example 5

Static Fluid Loss Measurements of the Treatment Fluids

Static fluid loss testing was performed on the treatment fluids using a high temperature/high pressure filter press. A sufficient amount of the treatment fluid was used to cover the entirety of a 10 μm Aloxite disc to a thickness of approximately 1 inch. The filter press was then sealed, pressurized to 500 psi and heated to 320° F. for 16 hours to set the gel. The filter press was then cooled, depressurized, opened, and the gel was inspected for consistency. For gels that appeared to be visually satisfactory, approximately 75 mL of pH~4 12.5 lb/bbl NaBr brine was slowly added on top of the gel. The filter press was then sealed and pressurized to 100 psi with nitrogen. Flow was initiated through the gel, and the volume of liquid collected as a function of time at room temperature was recorded.

Figure 9:
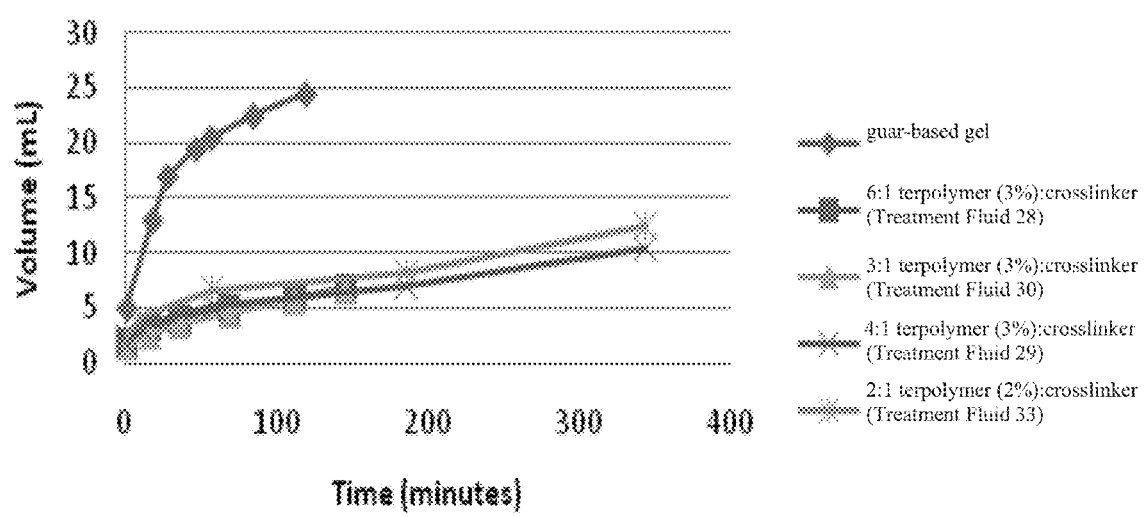
FIG. 9 shows an illustrative plot of fluid loss as a function of time for treatment fluids having varying ratios of terpolymer to crosslinking agent and various concentrations of terpolymer, where the gel was set for 16 hours at 320° F.

FIG. 9 shows an illustrative plot of fluid loss as a function of time for treatment fluids having varying ratios of terpolymer to crosslinking agent and various concentrations of terpolymer, where the gel was set for 16 hours at 320° F. The fluid loss of a typical guar-based gel is also presented for comparison. As shown in FIG. 9, all of the present terpolymer-based gels exhibited significantly improved fluid loss performance compared to that of a typical guar-based gel. Further, there was little difference in performance of the present gels based on their crosslinking density, as exemplified by the similar fluid loss performance of the gels formed using different ratios of terpolymer and crosslinking agent. At the concentrations of terpolymer tested, there was also only a slight difference in fluid loss performance as well, although treatment fluids having a higher terpolymer concentration performed better.

Figure 10:
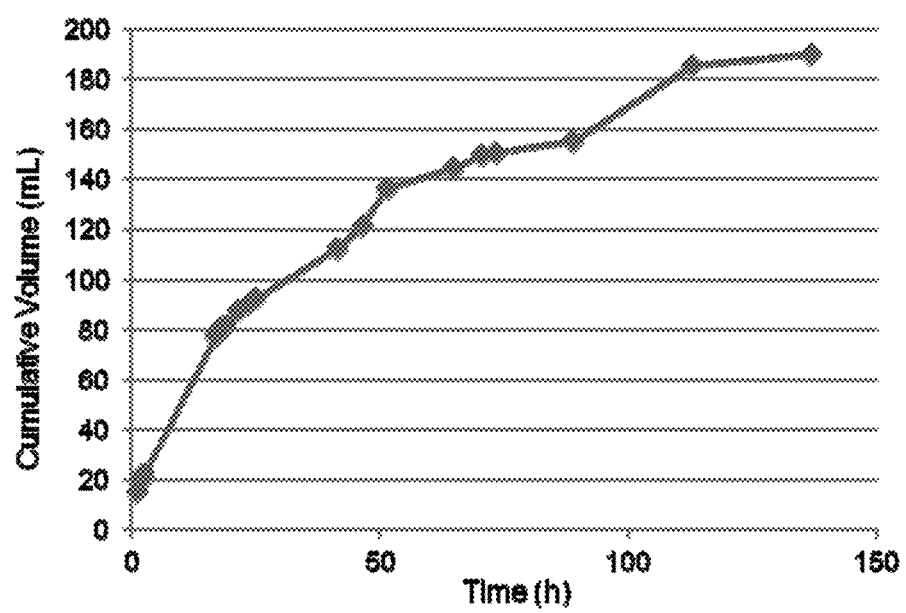
FIG. 10 shows an illustrative plot of fluid loss as a function of time for a treatment fluid where the gel was set for 72 hours at 320° F.
Figure 11A:
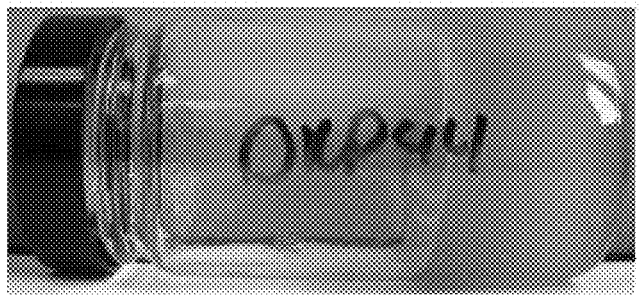
FIGS. 11A-11D show photographs of gels formed from treatment fluids 46-49 after static aging for 24 hours at 320° F. in the presence of a carbon steel coupon.
Figure 11B:
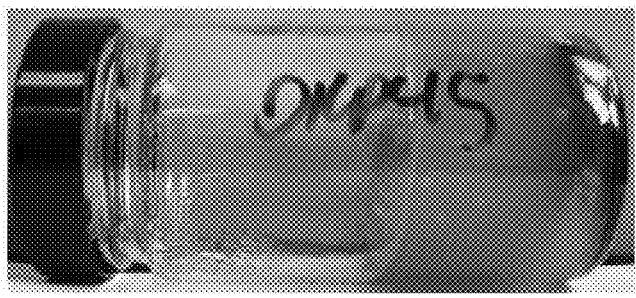
Figure 11C:
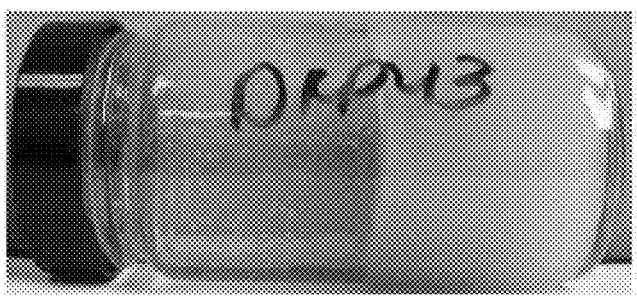
Figure 11D:
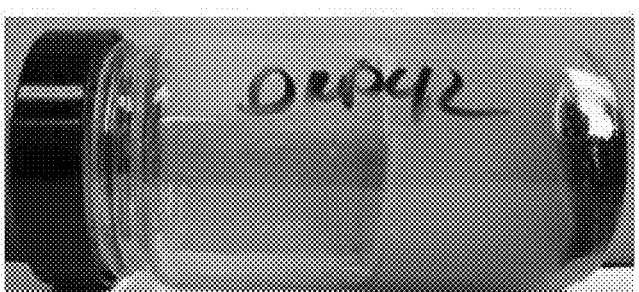

When the gel was set for 72 hours at 320° F., somewhat reduced fluid loss performance was observed. FIG. 10 shows an illustrative plot of fluid loss as a function of time for a treatment fluid where the gel was set for 72 hours at 320° F. The fluid loss performance illustrated in FIG. 10 was that observed for treatment fluid 30. As shown in FIG. 10, acceptable fluid loss performance was still observed after extended gel aging, although the amount of fluid loss did increase relative to shorter gel aging times. For example, over the first 6 hours, an approximately 3-fold higher fluid loss was observed. An initial rapid fluid loss was observed during the first fifteen minutes, followed by a reduced rate of fluid loss thereafter. As fluid loss was measured out to even greater lengths of time, the fluid loss rate began to slow even further after about 48 hours.

Example 6

Corrosion Testing of the Treatment Fluids

Since the treatment fluids were formulated at acidic pH, corrosion testing was performed using simulated downhole conditions. Corrosion testing was conducted for 7 days at 350° F. using carbon steel or 13 chrome steel coupons as a metal substrate. The measured carbon steel corrosion rate for a representative treatment fluid having a pH ranging between 4.2 and 4.8 was 21.4 mil/year. The measured corrosion rate for 13 chrome steel under the same conditions was only 0.0039 mil/year.

Additionally, since iron ions can catalyze the free radical degradation of acrylamide-based polymers, the stability of gels formed from the present treatment fluids in the presence of carbon steel coupons was evaluated. For this series of experiments, sodium sulfite was included in the treatment fluids as an additional iron ion scavenger. FIGS. 11A-11D show photographs of gels formed from treatment fluids 46-49 after static aging for 24 hours at 320° F. in the presence of a carbon steel coupon. As shown in FIGS. 11A-11D, neither the carbon steel coupon nor sodium sulfite appeared to significantly alter the gellation of the treatment fluid.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a treatment fluid comprising an aqueous carrier fluid, a crosslinking agent, a gel stabilizer for a crosslinked gel, and a terpolymer that comprises 2-acrylamido-2-methylpropanesulfonic acid, acrylamide, and acrylic acid monomer units, or any salt thereof;
wherein the gel stabilizer comprises a hydroxylamine;
introducing the treatment fluid into a subterranean formation;
allowing the treatment fluid to form a gel in the subterranean formation, the gel comprising a crosslinked gel formed from a reaction between the terpolymer and the crosslinking agent; and
breaking the gel after it has been in the subterranean formation for at least about one day.

2. The method of claim 1, wherein the subterranean formation is at a temperature ranging between about 275° F. and about 350° F.

3. The method of claim 1, wherein the treatment fluid further comprises a gellation accelerator that decreases a time required to form the gel.

4. The method of claim 1, wherein the gel stabilizer further comprises an antioxidant selected from the group consisting of a sulfite salt, erythorbic acid, ascorbic acid, a hydroquinone, any salt thereof, any derivative thereof, and any combination thereof.

5. The method of claim 1, wherein the crosslinked gel does not under in situ stress within the subterranean formation.

6. The method of claim 1, wherein a concentration ratio of the terpolymer to the crosslinking agent ranges between about 1:1 and about 6:1.

7. A method comprising:
providing a treatment fluid comprising an aqueous carrier fluid, a crosslinking agent, a gel stabilizer for a crosslinked gel, and a terpolymer that comprises 2-acrylamido-2-methylpropanesulfonic acid, acrylamide, and acrylic acid monomer units, or any salt thereof;
wherein the gel stabilizer comprises a hydroxylamine;
introducing the treatment fluid into a subterranean formation; and
allowing the treatment fluid to form a crosslinked gel in the subterranean formation, the crosslinked gel being formed from a reaction between the terpolymer and the crosslinking agent and the crosslinked gel not flowing under in situ stress within the subterranean formation.

8. The method of claim 7, wherein the crosslinked gel at least partially blocks the flow of formation fluids in at least a portion of the subterranean formation.

9. The method of claim 7, further comprising:
breaking the crosslinked gel after it has been in the subterranean formation for at least about one day.

10. The method of claim 7, wherein the subterranean formation is at a temperature ranging between about 275° F. and about 350° F.

11. The method of claim 7, wherein the treatment fluid has a pH ranging between about 4.2 and about 4.8.

12. The method of claim 7, wherein a concentration ratio of the terpolymer to the crosslinking agent ranges between about 1:1 and about 6:1.

13. The method of claim 7, wherein the gel stabilizer further comprises an antioxidant selected from the group consisting of a sulfite salt, erythorbic acid, ascorbic acid, a hydroquinone, any salt thereof, any derivative thereof, and any combination thereof.

14. A method comprising:
providing a treatment fluid comprising an aqueous carrier fluid, a crosslinking agent, a gel stabilizer for a crosslinked gel, and a terpolymer that comprises 2-acrylamido-2-methylpropanesulfonic acid, acrylamide, and acrylic acid monomer units, or any salt thereof;
wherein the gel stabilizer comprises a hydroxylamine;
introducing the treatment fluid into a subterranean formation;
allowing the treatment fluid to form a gel in the subterranean formation that at least partially blocks the flow of formation fluids in at least a portion of the subterranean formation, the gel comprising a crosslinked gel formed from a reaction between the terpolymer and the crosslinking agent; and
breaking the gel after it has been in the subterranean formation for at least about one day.

15. The method of claim 14, wherein the subterranean formation is at a temperature ranging between about 275° F. and about 350° F.

16. The method of claim 14, wherein a concentration ratio of the terpolymer to the crosslinking agent ranges between about 1:1 and about 6:1.

17. The method of claim 14, wherein the gel stabilizer further comprises an antioxidant selected from the group consisting of erythorbic acid, ascorbic acid, any salt thereof, any derivative thereof, and any combination thereof.

18. The method of claim 14, wherein the crosslinked gel does not flow under in situ stress within the subterranean formation.

* * * * *